US009308466B2

(12) United States Patent
Akavia et al.

(10) Patent No.: US 9,308,466 B2
(45) Date of Patent: Apr. 12, 2016

(54) TOY CONNECTIVE RECOGNITION ARRANGEMENT

(71) Applicant: SEEBO INTERACTIVE LTD., Tel Aviv (IL)

(72) Inventors: Lior Akavia, Tel Aviv (IL); Liran Akavia, Tel Aviv (IL); Ido Kleinman, Tel Aviv (IL); Lee Weinfield, Tel Aviv (IL)

(73) Assignee: SEEBO INTERNATIONAL LTD., Tel Aviv (IL)

( * ) Notice: Subject to any disclaimer, the term of this patent is extended or adjusted under 35 U.S.C. 154(b) by 0 days.

(21) Appl. No.: 14/406,640

(22) PCT Filed: Jun. 10, 2013

(86) PCT No.: PCT/IL2013/000055
§ 371 (c)(1),
(2) Date: Dec. 9, 2014

(87) PCT Pub. No.: WO2013/186769
PCT Pub. Date: Dec. 19, 2013

(65) Prior Publication Data
US 2015/0151212 A1    Jun. 4, 2015

Related U.S. Application Data

(60) Provisional application No. 61/657,914, filed on Jun. 11, 2012.

(51) Int. Cl.
| | |
|---|---|
| A63H 33/26 | (2006.01) |
| A63H 13/02 | (2006.01) |
| A63H 3/36 | (2006.01) |
| A63F 3/00 | (2006.01) |

(52) U.S. Cl.
CPC ............ *A63H 33/26* (2013.01); *A63H 3/36* (2013.01); *A63H 13/02* (2013.01); *A63F 3/00643* (2013.01); *A63F 2003/00662* (2013.01)

(58) Field of Classification Search
CPC ....... A63F 3/0064; A63F 13/02; A63F 13/50; A63F 2003/00681; A63F 2003/00678; A63F 2003/00662; A63H 33/26
See application file for complete search history.

(56) References Cited

U.S. PATENT DOCUMENTS 6,290,565 B1 *   9/2001   Galyean, III et al. ........... 446/99

* cited by examiner

*Primary Examiner* — Jay Liddle
*Assistant Examiner* — Alex F. R. P. Rada, II
(74) *Attorney, Agent, or Firm* — Leason Ellis LLP.

(57) ABSTRACT

The present invention provides a novel recognition arrangement configured to allow identification of a detachable toy element and its relative position on a play structure so as to enable a further display of a virtual character of said toy element in its relative position on the play structure on a smart device screen displaying an image of said play structure. The recognition arrangement provided herein comprising a TAG component affixed to the detachable toy element and an environmental recognition component (ERC) affixed to the play structure. The identification of a specific detachable toy element and its position on the play structure are obtained upon attachment of the TAG component and the ERC. Attachment of the TAG component and the ERC is detected by periodic scanning of a control unit connected to the play structure for changes of voltage or current values. Upon detection of such a change, the sampled value is delivered to the smart device for further interpretation and display.

12 Claims, 9 Drawing Sheets

TOY CONNECTIVE RECOGNITION ARRANGEMENT

CROSS-REFERENCE TO RELATED PATENT APPLICATIONS

This application is a U.S. National Phase Application under 35 U.S.C. §371 of International Patent Application No. PCT/IL2013/000055, filed Jun. 10, 2013, and claims the priority of U.S. Provisional Patent Application 61/657,914, filed Jun. 11, 2012, all of which are incorporated by reference in their entireties. The International Application was published on Dec. 19, 2013 as International Publication No. WO 2013/186769 A1.

TECHNOLOGICAL FIELD

The invention is related to a recognition arrangement of detachable toy elements across a play structure in connected interactive playing systems.

BACKGROUND

Toys, games, playing systems and other similar entertainment and educational systems are well known for providing entertainment opportunities as well as valuable learning to children and adults.

In the new era when smart devices become integral part of our life, it seems that the possibilities of bringing fun and excitement as well as education and learning through games and toys are limitless and the options to challenge children's imaginations and to encourage creativity and social interactivity are infinite.

Although enormous number of games and toys is available in the market, most of them offer only a primitive engaging play experience, particularly for older children.

GENERAL DESCRIPTION

There is a need in the art for more exciting and entertaining games and toys that will increase learning and entertainment opportunities for children and stimulate creativity and imagination.

One characteristic that increases significantly the play experience is the interactive dialogue between the player and the toy. For best dialogue there is a need for a real time recognition of the toy elements on a connected displaying smart device and further recognition of the toy elements specific location within the toy environment, e.g., recognition of at least one specific jungle animal doll and its specific location in a jungle playing platform, such that the child positions the specific animal on the play structure and a character of the positioned animal appears on a connected screen, preferably having a background view simulating the jungle playing platform. In addition, upon a change in the position of the toy on the play platform As another example the toy elements may be a kitchen accessory while the toy environment is a kitchen setting, etc.

The present invention provides a novel toy connective recognition arrangement referred to hereinafter as: "recognition arrangement" (RE). The RE comprises two complementary components: a tag component (TAG) that is preferably attached to a detachable toy element, and an environmental recognition component (ERC) also referred to interchangeably as "hotspot" that may be embedded within a play structure (e.g. game board, game platform) or within a detachable toy element, in a scenario that the detachable toy elements are configured to be cascaded with each other, as will be described in details hereinafter.

The recognition arrangement provided herein is configured and operable to allow a real time recognition of a specific detachable toy element that a child is playing with, and further to provide identification of the specific location that the child has connected to the play structure, so as to allow simultaneous recognition of one or more toy element as well as their specific location within the play structure so as to simultaneously display a character of the toy element on the screen on a smart device, as been described in details in WO 2013/024470 of the same inventors incorporated herein by reference.

In some embodiments a recognition arrangement configured to allow identification of a detachable toy element and its relative position on a play structure so as to enable a further display of a virtual character of said toy element in its relative position on the play structure on a smart device screen displaying an illustration of said play structure is provided. The arrangement comprising a TAG component affixed to the toy element and an environmental recognition component (ERC) affixed to the play structure, wherein identification of the detachable toy element and its position on said play structure are obtained upon attachment of the TAG component and the ERC. Attachment of the TAG component and the ERC affixed to said play structure is detected by periodic scanning of a control unit connected to said play structure for changes of voltage or current values. Upon detection of such a change, the sampled value is delivered to said smart device for further interpretation and display.

The TAG component comprises at least a non conductive housing comprising two conductive elements and a resistor. In some embodiments, instead of a resistor the TAG comprises a 1-wire memory and a third conductive element connected to the ground. The TAG may further comprise a magnet or a ferromagnetic material configured to ensure stable attachment of the TAG to the ERC.

In some embodiment, the two conductive elements are two PCB pad rings separated from each other via an insulating ring. Alternatively, the two conductive elements may be metal pins.

In some embodiments, the ERC comprises a non conductive housing and two conductive elements. It may further comprise a third conductive element connected to the ground. Additionally, the ERC may further comprise a magnet or a ferromagnetic material configured to ensure stable attachment of said ERC to said TAG.

Preferably, the ERC further comprises at least two holes configured to allow pass way of electric wires from the ERC to a control unit so as to deliver a signal created upon attachment of a TAG to the ERC.

The recognition arrangement may be used in a connected interactive toy systems wherein, the toy structure comprises a plurality of ERCs positioned on various locations on said play structures, and wherein each of said ERCs is configured to be reversibly attached to a plurality of detachable toy elements, each of said detachable toy elements is connected to a unique TAG having a characteristic resistance value that allows identification of each specific TAG upon attachment to an ERC on said smart device.

In some embodiments, each ERC positioned on the toy structure is connected to the control unit via one communication line of said control unit. Alternatively, two or more ERCs positioned on the toy structure may be connected to the control unit via one communication line of said control unit.

In some embodiments, the detachable toy element comprises a TAG and at least one ERC and it is configured to be cascaded with at least one additional detachable toy element. The TAG may comprise an active component such as a LED or a buzzer.

In some embodiments of the invention, the communication between the TAG, the ERC and the control unit is analog communication, while in some other embodiments, the communication is a digital communication.

The present invention is further directed to a recognition arrangement configured to allow identification of a detachable toy element and its relative position on a play structure so as to enable a further display of a virtual character of said toy element in its relative position on the play structure on a smart device screen displaying an illustration of said play structure, said arrangement comprising a TAG component affixed to said toy element, an environmental recognition component (ERC) affixed to said play structure, and a control unit, wherein identification of said detachable toy element and its position on said play structure are obtained upon attachment of said TAG component and said ERC by periodic scanning of said control unit for changes of voltage or current values, and wherein upon detection of such a change, the sampled value is delivered to said smart device for further interpretation and display.

The TAG comprises at least a non-conductive housing, two PCB pad rings separated from one another by an insulating ring, a resistor and a metal. The ERC comprises a non conductive housing, two conductive elements configured to attach said PCB pad rings of the TAG, and a magnet, wherein, upon attachment of the TAG and the ERC an electric circuit is closed and a resistance value correlative to the resistor of said TAG is delivered to said control unit. In such embodiments, the communication between the TAG, the ERC and the control unit is analog communication.

In some other embodiments, instead of a resistor the TAG comprises a 1-wire memory. In such embodiment, the communication between the TAG, the ERC and the control unit is a digital communication.

BRIEF DESCRIPTION OF THE DRAWINGS

Examples illustrative of embodiments of the disclosure are described below with reference to figures attached hereto. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings.
The figures (Figs.) are listed below.

FIGS. 2A and 2B schematically illustrate one possible structure of a TAG configured to be connected to a detachable toy element, wherein FIG. 2A is an isometric view of the TAG and FIG. 2B is a cross section view of the same TAG.

FIG. 8B exemplifies connection of one toy element to the right hotspot; FIG. 8C exemplifies connection of two toy element to the right and left hotspots; and FIG. 8D exemplifies connection of the two toy element of FIG. 8C in an opposite order.

DETAILED DESCRIPTION OF EMBODIMENTS

Figure 1:
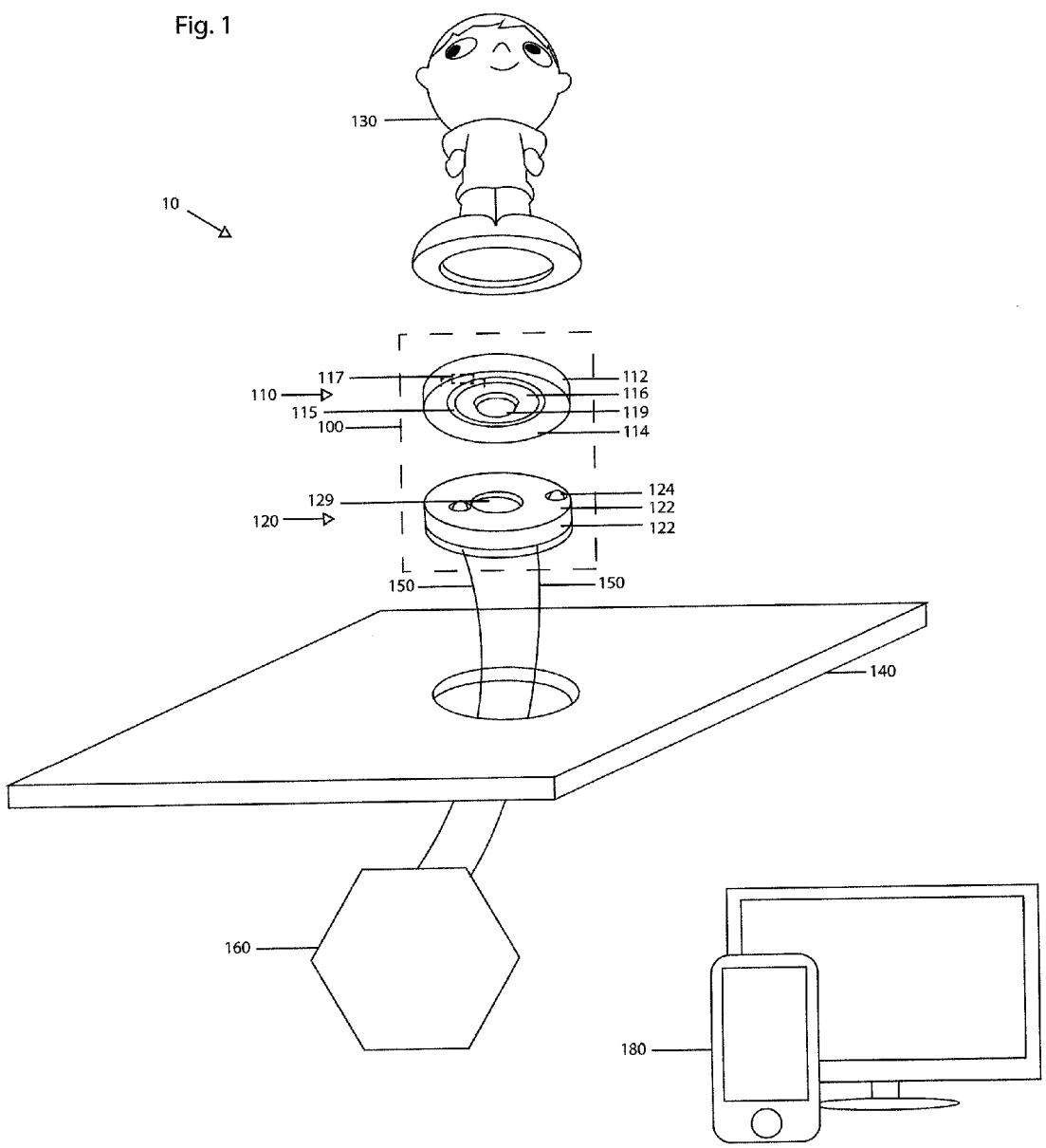
FIG. 1 is a schematic illustration of an example of a connected interactive toy system utilizing a detachable toy recognition arrangement according to one possible embodiment of the invention.

In the following description, various aspects of an interactive playing system with connected toys will be described. For the purpose of explanation, specific configurations and details are set forth in order to provide a thorough understanding of the invention.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure can be carried out or practiced in various ways, and that the disclosure can be implemented in embodiments other than the exemplary ones described herein below. The descriptions, examples and materials presented in the description, as well as in the claims, should not be construed as limiting, but rather as illustrative.

The present invention provides a recognition arrangement for connected interactive toy systems configured to allow identification of a specific detachable toy element out of plurality of such elements, and further to allow identification of its specific position/location on the play structure. A character of the recognized toy element is then displayed on a screen of a smart device simulating/illustrating the play structure, thus providing the user a unique interactive playing experience.

The recognition of a specific detachable toy element and its location on the play structure is generally achieved upon attachment of a toy element comprising the TAG to a hotspot embedded in or attached to the play structure. This attachment results in a change of a resistance value that is being read and interpreted by the control unit. The inventors of the present invention have utilized the change in the resistance value to indicate attachment of a toy element with its relevant position on the play structure. This is accomplished by periodic scans being conducted by the control unit. The control unit microcontroller scans all its analog to digital converter (ADC) ports (which are in turn attached to the hotspots terminals) periodically for changes in voltage, and if a change is detected than it samples the current value and sends the smart device the sample value of the sampled ADC channel via the wireless connection. The smart device in turn can interpret the resistance value of the TAG by a simple voltage divider calculation.

In accordance with the present invention, a detachable toy element may be a figure or parts thereof, an accessory, a tool, a structure and else. For example, the detachable toy element may be an animal, a soldier figure, a kitchen accessory, a doctor tool, a body organ, etc.

The TAG is affixed to the detachable toy element, preferably but not necessarily, at the bottom side of the toy element and is adapted to create a unique signature characterizing the detachable toy that it is connected to, based on its specific resistance value as will be described in details hereinbelow.

The ERC is functionally connected to a play structure (the structure may be a two dimension structure or a three dimension structure), such as but not limited to a jungle, a castle, a kitchen, a human like doll, a potato head, building blocks, or else.

The ERC is preferably affixed to the play structure and it is configured to deliver a signal to the control unit (containing a micro controller chip), that may also be attached to the same play structure, upon attachment to the TAG. The signal being delivered is indicative to the specific signature of the TAG, and further contains specific information on its location on the play structure. The signal is than delivered from the control unit to a smart device. The delivered information about the TAG attachment to other elements in the connected toy system allows manipulation of the information for activation of reactions such as sound, picture, video or else, on the smart device.

In some embodiments, the detachable toy elements may be cascaded. In such case, the detachable toy elements may comprise a TAG and a hotspot configured to be attached to additional TAG affixed in another detachable toy element.

In some other embodiments, a single detachable toy element may comprise at least one TAG and at least one ERC.

As mentioned in the above, the signal is created only when the TAG is physically attached to the ERC. Physical attachment between the TAG and the ERC may be established by any suitable attachment mechanism such as by not limited to a magnet to magnet, a magnet to ferromagnetic material, mechanical attachment by complementary structural components, or by elastic moveable elements that allow insertion and fastening of the TAG into the ERC.

In some embodiments, the specific signature of the TAG component may be created by a resistor component. In such embodiment each detachable toy element comprises a unique resistance value. Alternatively, other ways may be used such as but not limited to capacitance sensing, digital memory reading via 1-Wire components, etc.

In one specific embodiment, instead of a resistor the TAG comprises 1-Wire memory device. 1-Wire device is generally a communications bus system that provides low-speed digital data, signaling, and power over a single signal. Instead of implementing a resistor on the TAG, a 1-wire simple memory device is assembled, and instead of ADC channel on the microprocessor on the control unit, a GPIO line is used to read the memory and provide power to the TAG memory element. Such variation provides virtually unlimited amount of distinct TAG indexes (whereas analog reading has a limitation of tag indexes according to the ADC resolution and reading error margin). However, the price of the TAG usually increases as digital memory components are more expensive than a resistor.

When 1-wire memory is used instead of a resistor, the TAG becomes a smart as it has a memory and as such, data may be transferred to and from the TAG, thereby providing the TAG modularity that can be used in across different play sessions. For example, it the TAG is attached to a cow figure and the child take the cow to drink several consequent time, the control unit may interpret this sequence to produce an announcement to the child that the cow in not thirsty anymore.

The number of ERCs in the play structure may vary, as it is mainly determined according to the specific play structure, the detachable toy elements accompanied thereto, and the number of communication lines available in the control unit as explained above. In some embodiments, more than one ERC are connected to one line. In addition the targeted users age and complexity of the game system are also factors that may dictate the amount or ERCs to be affixed to the play structure.

In some embodiments the number of TAGs i.e., the number of detachable connected toy elements may be larger than the number of ERCs. In some other embodiments, the number of TAGs may be smaller than the number of ERCs. In some other embodiments the number of TAGs and the number of ERC may be similar or even equal.

In some embodiments, the play structure is covered with a play surface (card) that is replaceable so as to provide the user a variety of playing environments. In such embodiment, the recognition of a specific play surface is achieved by a TAG positioned on each play card that is configured to be attached to an ERC on the play structure so as to allow recognition of the specific card positioned now on the play structure.

Reference is now made to the figures.

FIG. 1 is a schematic illustration of one example of a connected interactive toy system 10 (denoted herein after: "toy system") utilizing a detachable toy recognition arrangement 100 across a play structure 140 according to one possible embodiment of the invention.

Toy system 10 generally comprises: a toy recognition arrangement 100 containing a TAG 110 and an ERC 120, a detachable toy element 130, a play structure 140, a control unit 160, and a smart device 180.

TAG 110 is firmly attached to detachable toy element 130, such as, but not limited to, a boy (in a playground), a cow (in a field), a lion (in a jungle), a soldier (in a castle) a kitchen accessory (in a kitchen), a body organ (in a potato head), a dressing article (of a doll), etc. TAG 110 is designed to carry a unique readable signature of a specific detachable toy element 130. In the specific example illustrated in this figure, TAG 110 is composed of a plastic housing 112, two layers of conductive PCB: an outer PCB pad ring 114, and an inner PCB ring 116 separated from each other by an insulating PCB ring 115, and a metal pin 119 for ensuring attachment to magnet 129 of ERC 120.

ERC 120 is firmly attached to play structure 140 that functionally serves as the toy environment and may be constructed as, but not limited to, a field, a jungle, a castle, a kitchen a human like doll, a potato head, etc., in two dimensions (such as a chess board) or in three dimensions (such as a doll house). ERC 120 in the specific example illustrated in this figure comprises a housing 122 and two electrical contacts 124 configured to contact the two PCB ring pads of the TAG, and a magnet 129. ERC 120 is further connected via electrical wiring 150 to control unit 160. In some embodiments, control unit 160 may be an integral part of play structure 140 or separated thereof. In some other embodiments, control unit 160 may be a part of a toy console or a game module. Electronic control unit 160 may be connected via wired or wireless connection to a smart device 180 such as a Smartphone, a tablet, a smart television, a server, a computer, and any other smart device that may be suitable for the purposes of the present invention. The Functionality of each particle mentioned above will be described in details hereinbelow with reference to FIGS. 2-6.

TAG 110 and ERC 120 are designed to trigger a signal only when they are physically attached to each other. A signal, corresponding to a readable signature of the specific detachable toy element 130 connected to a specific ERC, signals the position/location of the specific detachable toy element 130 on play structure 140. The signal produced is delivered in real time to the smart device 180 and a matching character to element 130 is displayed on the smart device on a background that is conceptually similar to the play structure, wherein the virtual character is positioned on the screen in a similar position as the toy element with respect to the play structure. For example, if play structure is a jungle with a coconut tree, a stream, and a banana tree and toy detachable toy element 130 is a monkey. When the child positions the monkey on a hotspot near the banana tree, the same will appear on the smart device screen. When the child will change the monkey's position along the play structure and reposition it on a hotspot near the stream, the virtual character will change its position in a real time, to its new position on the screen of the smart device.

It should be clear that for simplifying reasons only one TAG 110 and one ERC 120 are drawn in the figure, but the number of each of them being used with a single play structure may be larger.

Figure 2A:
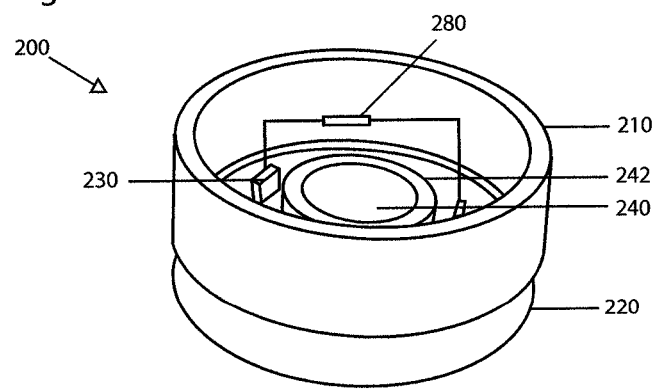
Figure 2B:
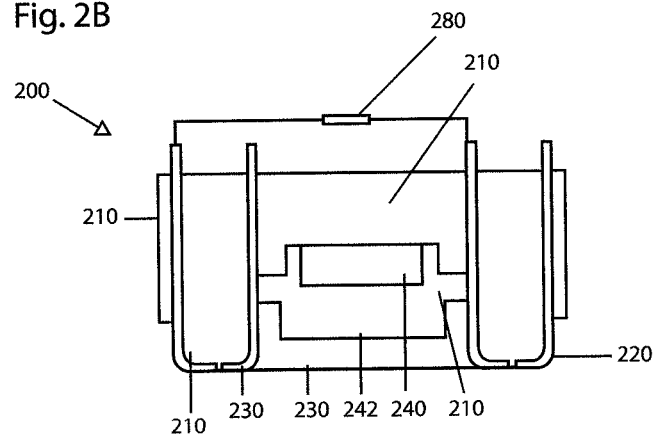

FIGS. 2A-2B schematically illustrates one optional structure of a TAG 200 comprising a magnet and two conductive rings, wherein FIG. 2A is an isometric view, and FIG. 2B is a cross section view.

In an isometric view, TAG 200 comprises a housing 210 preferably made of a plastic or any other non-conductive and non ferromagnetic material, two conductive elements, an external contact element 220 shaped as a ring with an upper vertical wall, and an internal contact element 230 also shaped as a ring with a vertical wall and a base, wherein the two conductive elements are separated from one another and connected only via a resistor 280. TAG 200 further comprises a magnet 240 and a magnet niche 242. The assembly of the aforementioned elements and the interrelations between them are also shown in FIG. 2B in a cross section view of TAG 200, showing the housing 210 covering most of the conductive contact elements 220 and 230, external contact element 220, internal contact element 230, magnet 240, and magnet niche 242, wherein, magnet 240 is configured to attach another magnet or a ferromagnetic component positioned in the ERC's so as to insure that TAG 200 will come into physical contact with complementary ERCs embedded in or attached to the game structure by using magnetic forces. Housing 210 may be made of plastic, wood, or any other non conductive material. When TAG 200 comes into physical contact with an ERC embedded in or attached to a play structure (not shown in this figure), external contact element 220 (outer conductive ring), and internal contact element 230 (inner conductive ring) of TAG 200 become electrically connected to the corresponding contact elements in the ERC and an electric circuit is closed, thereby creating an electric current, with a value corresponding to the resistance of a resistor 280 located in TAG 200 (shown in FIG. 2b). The value of the resistor corresponds to the identification of a unique detachable toy element. The recognition of the specific toy element is achieved by comparing the resistance measure to predefined values, wherein the predefined values are preferable located on the smart device.

Figure 3A:
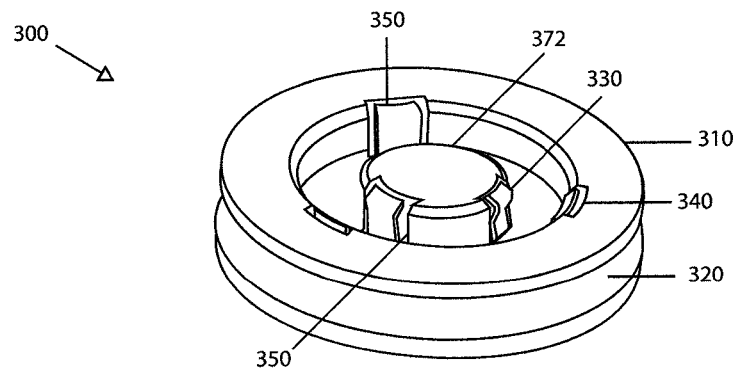
FIGS. 3A and 3B are schematic illustrations of one possible structure of an ERC (hotspot) configured to be attached to or assembled with a play platform/structure/board, wherein FIG. 3A demonstrates an isometric view and FIG. 3B demonstrates an exploding view of the same hotspot.
Figure 3B:
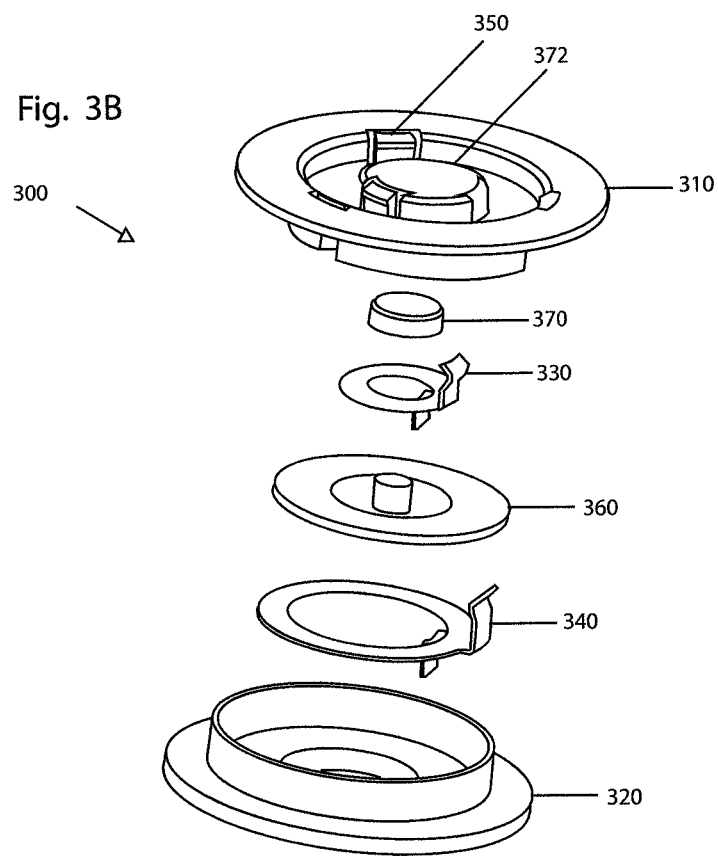

FIG. 3 is a schematic illustration of one optional structure of ERC 300 comprising a magnet and two conductive rings, wherein FIG. 3A is an isometric view, and FIG. 3B is an exploding view. In accordance with the example illustrated in this figure, ERC 300 comprises a top cover 310 and a bottom cover 320, both may be made of a plastic, wood or any other non conducting material, an internal circular contact element 330, an external circular contact element 340, an insulating element 360 configured to separate contact element 330 from contact element 340, a magnet 370, a magnet cover 372, and at least one elastic fastening element 350.

Magnet 370 is used for guaranteeing that the TAG will come into physical and electrical contact with ERC 300. In some embodiments, magnet 370 may be replaced by a ferromagnetic metal. Elastic fastener 350 functionally is configured to guarantee the insertion of a TAG into ERC 300. Top cover 310 and bottom cover 320 may be made of one housing unit (not shown) that further contains the magnet cover 372.

When a physical contact is established between a detachable toy element comprising a TAG and ERC 300 (shown in FIG. 6), internal contact element 330, and external contact element 340 become electrically connected to the corresponding contact elements in the TAG and an electric circuit is closed, thereby creating an electric current, with a value corresponding to the detachable toy element that is connected to the TAG. In order to insulate internal contact element 330 and external contact element 340 from one another, insulating layer 360 that is made of an insulating material, is used.

In some embodiments, ERC 300 may comprise 3 contact elements (not shown) wherein one contact is connected to ground.

ERC 300 is not only adapted to deliver the specific signal of the TAG attached to it but it further contains information about its positioning in the plays structure. In accordance with embodiments of the invention, ERC 300 is physically connected to the control unit and via that connection additional information is obtained in the Smart device to thereby recognize both, a specific toy element and the specific location on/within the play structure on which the toy element is positioned at a specific moment.

Figure 4:
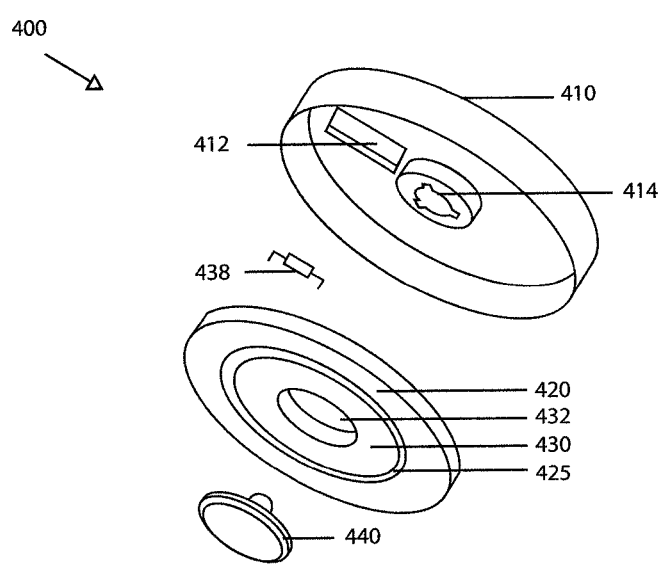
FIG. 4 is a schematic exploding view illustration of another possible structure of a TAG according to some embodiments.

FIG. 4 is a schematic exploding view illustration of another possible structure of a TAG 400 comprising two PCB pads as contact elements and a steel pin configure to be attached to a magnet positioned on an ERC, according to some embodiments.

TAG 400 is generally composed of three layers: Top layer comprising a housing 410 preferably made of a plastic or another non conductive material. Housing 410 comprises a spacer for a resistor 412, preferably a SMT resistor, and a holder 414 for a steel pin.

A PCB mid layer comprising two PCB pads shaped as rings, an outer ring 420 and an inner ring 430 separated from each other by a third PCB insulating ring 425. The PCB pads are conductive and there function is similar to the external and internal contact elements (220 and 230) illustrated in FIG. 2. The mid layer further comprises a pin hole 432, and a resistor 438 (SMT resistor in this specific example) configured to connect the inner and outer PCB pads circles. TAG 400 further comprises a bottom layer containing a steel pin 440.

Figure 5:
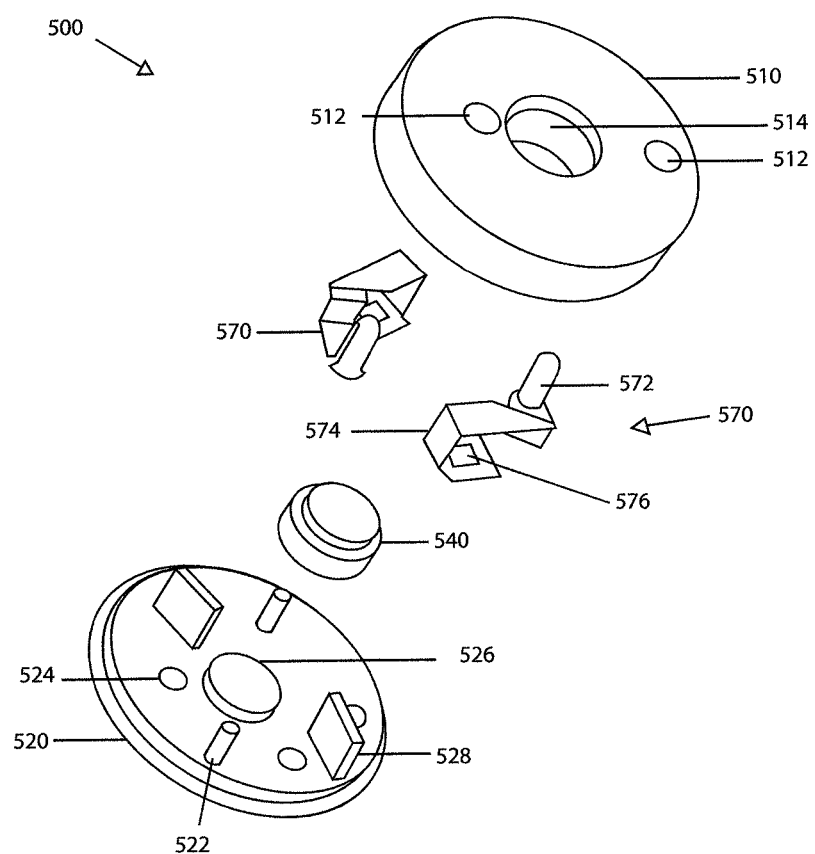
FIG. 5 is a schematic exploding view illustration of another possible structure of ERC.

FIG. 5 is a schematic exploding view illustration of another possible structure of a ERC 500 comprising conductive pins, according to some embodiments.

ERC 500 is generally composed of three main layer: Top layer comprising a housing 510 preferably made of a plastic or another non conductive material. Housing 510 comprises two holes 512 for pin contacts to come through them, and a space 514 for a magnet.

Two similar contact elements 570 are positioned as a mid layer. Each contact 570 is composed of a pin 572 attached to a Folded metal sheet 574 configured and operable to strengthen the pin and provide it additional elasticity so as to make it more springy. Metal sheet 574 comprise at it bottom side an opening 576 to allow threading of electric wires. Mid layer further comprise a Magnet 540 with a similar function as magnet 240 illustrated in FIG. 2 and magnet 370 illustrated in FIG. 3.

Bottom layer of ERC 500 is composed of a plastic housing 520 containing at least one pin 522 to click the top housing 510 with bottom housing 520, wires holes 524 configured to allow threading of the electrical wires, a magnet stand 526, and a pair of walls 528 for supporting and holding up contacts 570 so as to provide more stable positioning of contacts 570.

Figure 6A:
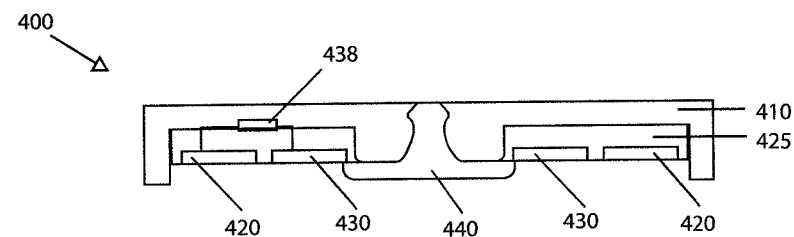
FIGS. 6A to 6C are schematic cross section illustrations of the TAG illustrated in FIG. 4 and the ERC illustrated in FIG. 5, wherein FIG. 6A demonstrates the TAG, FIG. 6B demonstrates the ERC, and FIG. 6C demonstrates the TAG and the ERC attached to each other.
Figure 6B:
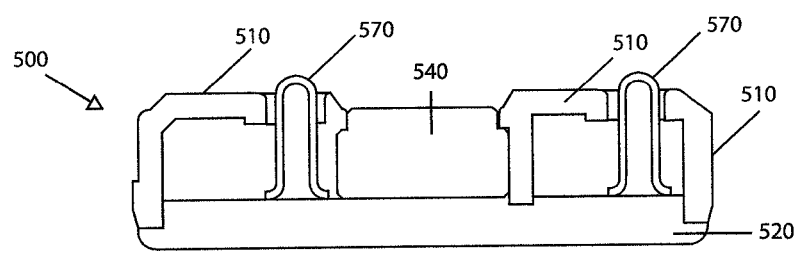
Figure 6C:
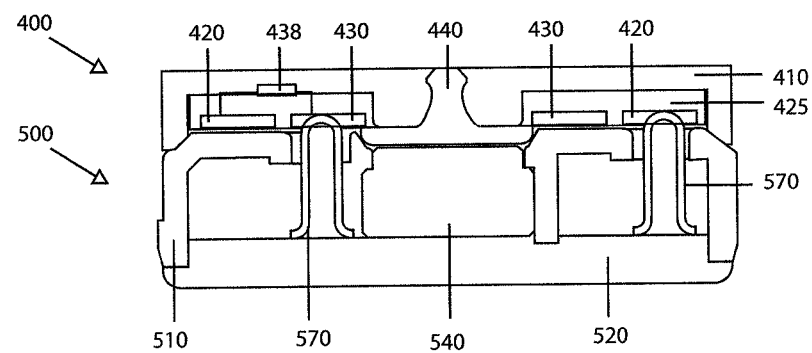

FIGS. 6A to 6C are schematic cross section illustrations of the TAG 400 illustrated in FIG. 4 and the ERC 500 illustrated in FIG. 5, wherein FIG. 6A demonstrates cross section of TAG 400, FIG. 6B demonstrates cross section of ERC 500, and FIG. 6C demonstrates cross section of TAG 400 and ERC 500 attached to each other.

Shown in the Figures are TAG 400 comprising: plastic housing 410, PCB pad outer ring 420, PCB pad inner ring 430, PCB insulating layer 425, steel pin 440, and SMT resistor 438. ERC 500 comprising: Top housing 510, bottom housing 520, contacts 570, and magnet 540.

When ERC 500 is physically attached to TAG 400, the two contacts 570 become in touch with the PCB pads outer and inner rings 420 and 430 in a manner that one contact touches the outer PCB pad ring and the other contact touches the inner PCB pad ring, thus closing an electric circuit thereby creating an electric current, with a value corresponding to the resistance of a resistor 438. The value of the resistor corresponds to the identification of a unique detachable toy element attached to it. The recognition of the specific toy element is achieved by comparing the resistance measure to predefined values, wherein the predefined values are preferable located on the smart device as explained in details hereinabove.

Figure 7:
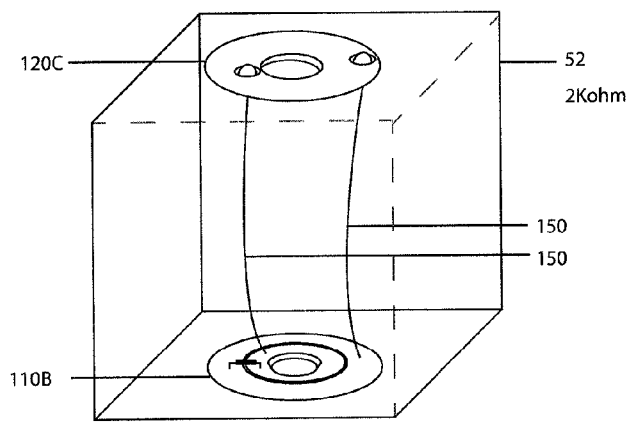
FIG. 7 schematically illustrates cascading of several units of recognition arrangements according to some embodiments.
Figure 7:
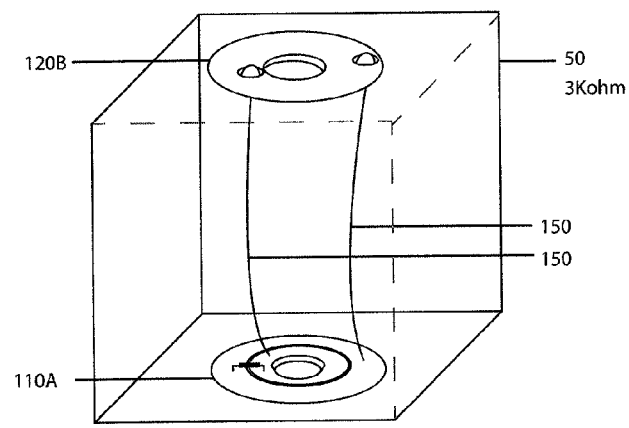
Figure 7:
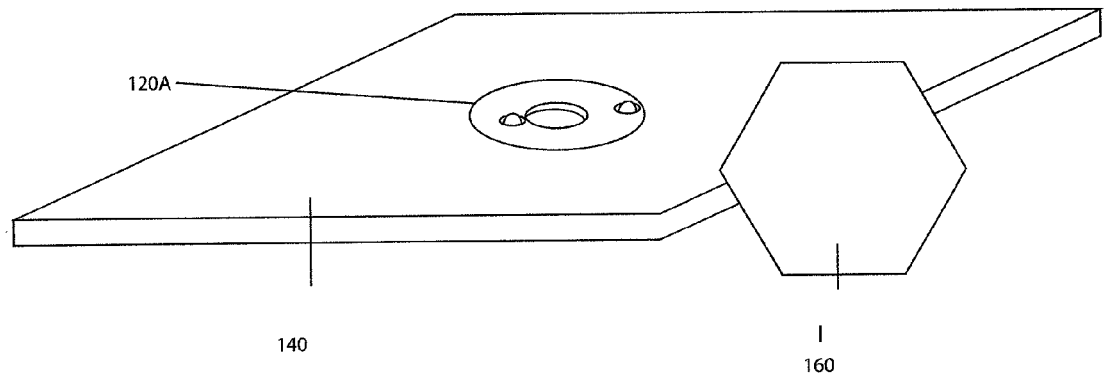

FIG. 7 schematically illustrates one example of cascading of several units of recognition arrangements according to some embodiments. Cascading can be made possible by adding at least one ERC in addition to a TAG in one detachable toy element. In the specific example illustrated in this figure, the detachable toy elements are cube 50 with a 3K Ohm TAG resistance value, and cube 52 with 2K Ohm TAG resistance value. Each cube comprises a TAG and an ERC, wherein cube 50 comprises TAG 110A and ERC 120B, and cube 52 comprises TAG 120C and ERC 110B, of which, the two terminals of the ERC and the TAG are connected by conductive electrical wiring 150. In addition, play structure 140 comprises ERC 120A and it is connected to control unit/game module 160 as described in details with reference to FIG. 1.

When cube 50 is attached to play structure 140 i.e., ERC 120A is attached to TAG 110A, the resistance is 3 K Ohm and the connected toy system recognizes that cube 50 is attached now to play structure 140.

When cube 52 is attached to play structure 140 i.e., ERC 120A is attached to TAG 110B, the resistance is 2 K Ohm and the connected toy system recognizes that cube 52 is attached now to play structure 140.

When cubes 50 and 52 are attached to each other (cascaded) and to play structure 140 i.e., ERC 120A is attached to TAG 110A, and ERC 120B is attached to TAG 110B the resistance is 1.2 K Ohm (3 k*2 k)/(3 k+2 k), and the connected toy system recognizes that cubes 50 and 52 are both attached now to play structure 140.

Figure 8A:
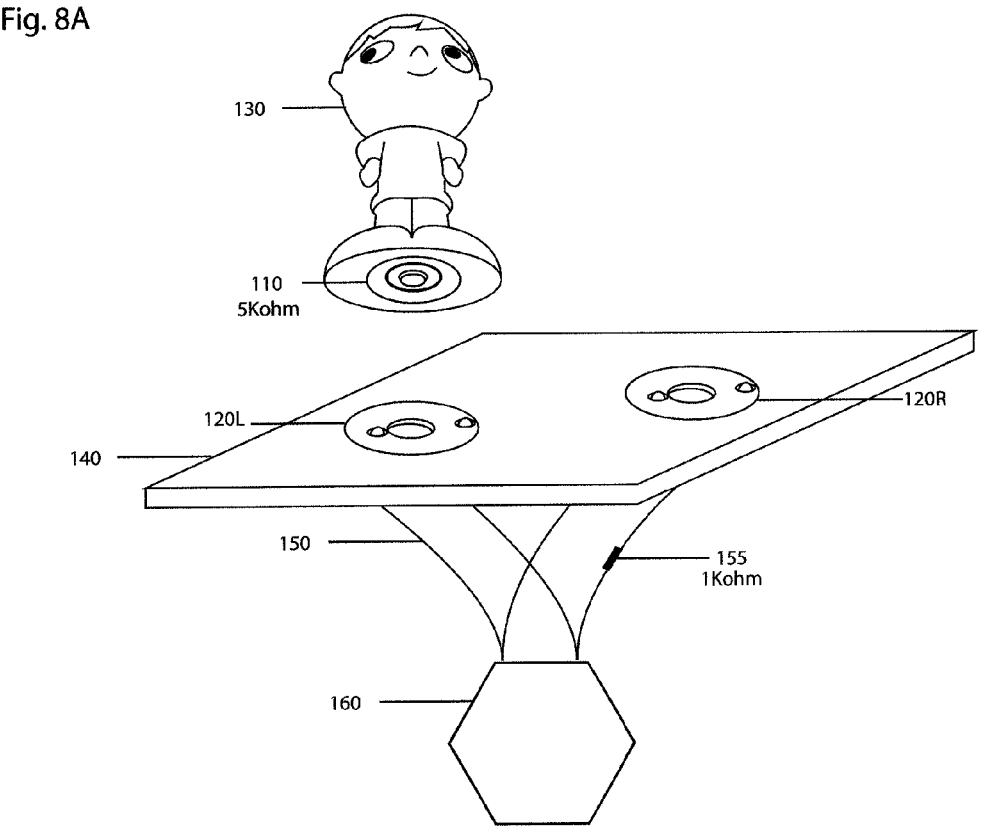
FIG. 8A to 8D schematically illustrate various embodiments of toy recognition arrangement configured to allow connection of two hotspots to one communication line on the game module, wherein FIG. 8A exemplifies connection of one toy element to the left hotspot.
Figure 8B:
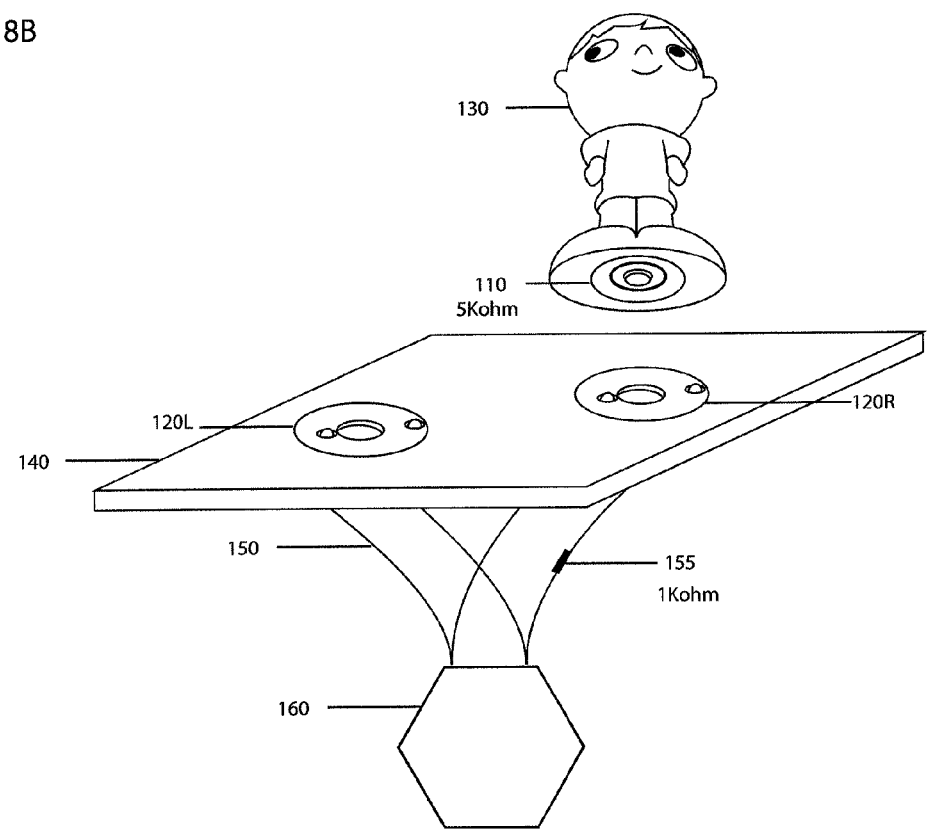
Figure 8C:
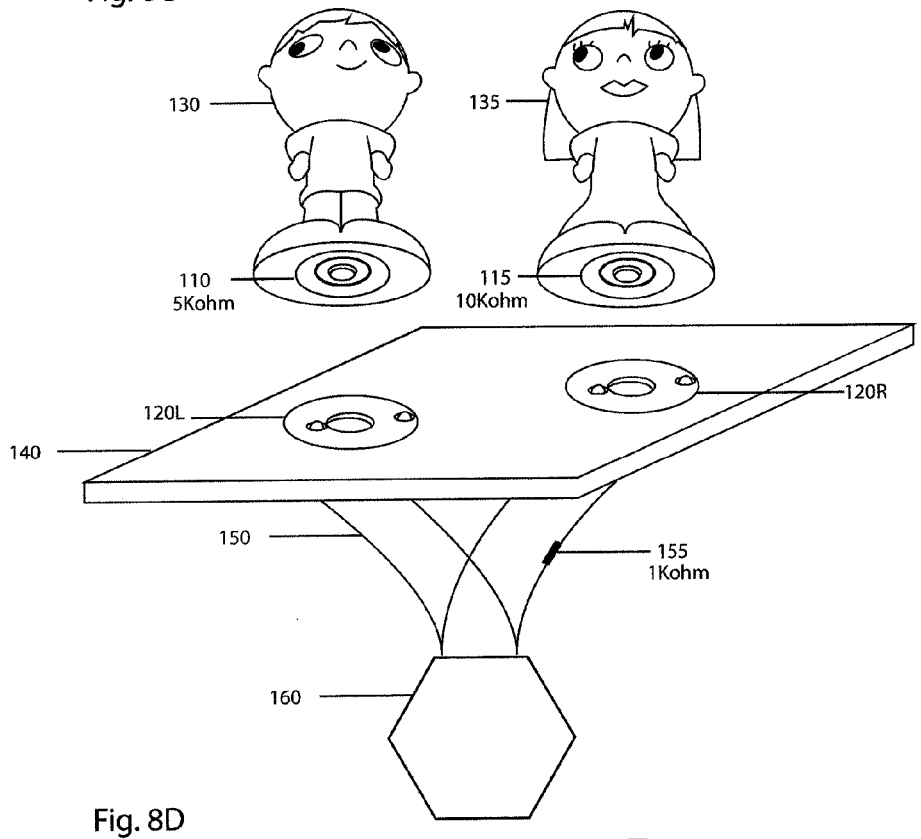
Figure 8D:
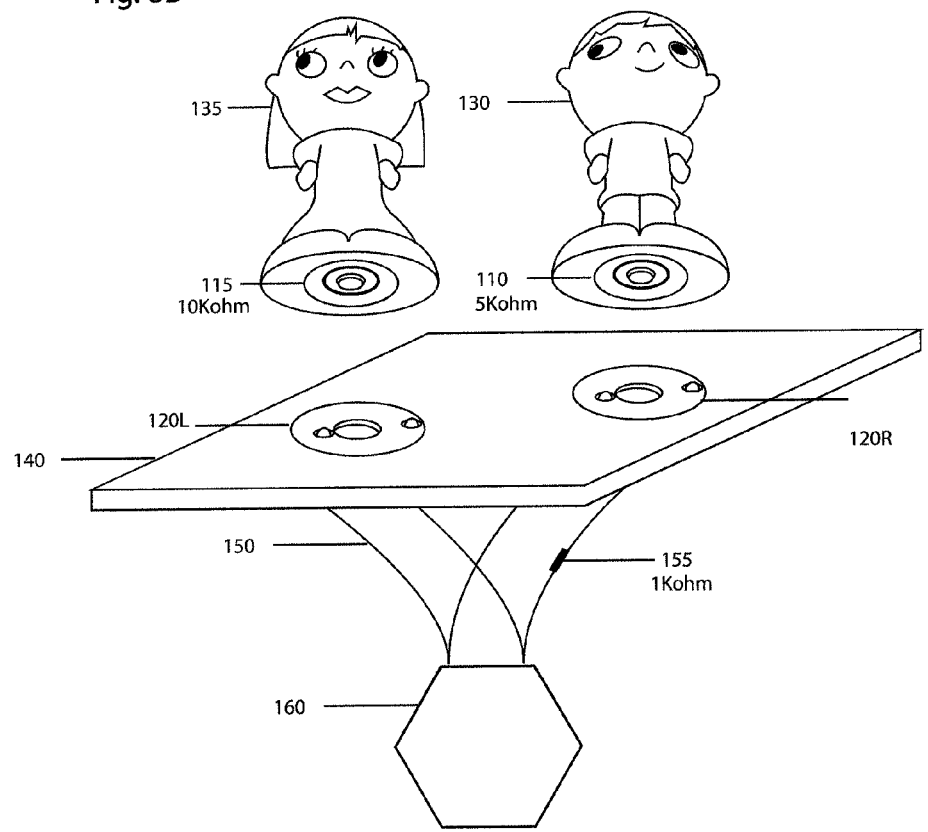

FIGS. 8A to 8D schematically illustrate various embodiments of toy recognition arrangement configured to allow connection of two ERCs to one communication line on the control unit (or a toy console or another game module). Connection of two or more hotspots on one line is enabled by adding a series resistance to one of the hotspots terminals 155, thereby allowing to increase the number of hotspots connected to the play structure without having to increase the amount of lines provided for the PCB board of the control unit. FIG. 8A exemplifies connection of a detachable toy element 130 comprising a TAG 110 having a resistance of 5K ohm, to an ERC 120L positioned on the left side of a play structure 140 and connected via wires 150 to control unit 160; The same toy element 130 with TAG 110 is connected in FIG. 8B to another ERC 120R positioned on the right side of play structure 140 that is connected to the control unit 160 via resistor 155 that in the specific example illustrated in this figure is with a value of 1K ohm. Consequently, when toy element 130 is attached to ERC 120R the total resistance that is read in the control unit 160 is 6K ohm. This resistance is being interpreted by the toy system to display on the smart device screen toy element 130 positioned in the location of ERC 120R and optionally to operate additional features that are relevant to this specific location on the play structure. In FIG. 8C two detachable toy elements 130 and 135 are now being played with. Toy element 130 comprised TAG 110 having and resistance value of 5K ohm is attached to the ERC 120L, while toy element 135 comprising TAG 115 having a resistance value of 10K ohm is attached to ERC 120R that is connected to resistor 155 so that the total resistance being read on this branch is 11K ohm. In such scenario, when the two detachable toy elements are connected in the specific position described above, the control unit reads a total resistance value of 3.44K ohm (5K*11K)/(5K+11K). This resistance value is being interpreted by the toy system to "recognize" and to display on the smart device screen toy element 130 positioned in the location of ERC 120L and toy element 135 positioned in the location of ERC 120R. In FIG. 8D detachable toy elements 130 and 135 replace places and as a result the total resistance read by the system changes to be 3.75K ohm (10K*6K)/(10K+6K). This resistance value is being interpreted by the toy system to "recognize" and to display on the smart device screen toy element 135 positioned in the location of ERC 120L and toy element 130 positioned in the location of ERC 120R.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

The invention claimed is:

1. A recognition arrangement configured to allow identification of a detachable toy element and its relative position on a play structure so as to enable a further display of a virtual character of said toy element in its relative position on the play structure on a smart device screen displaying an illustration of said play structure, said arrangement comprises a TAG component affixed to said toy element and an environmental recognition component (ERC) affixed to said play structure, wherein said TAG component comprises:
    a. a nonconductive housing containing two conductive elements made of two PCB pad rings separated from each other via an insulating ring;
    b. a magnet or a magnetizable material configured for stable attachment of said TAG to said ERC; and
    c. a resistor, the value of which corresponds to identification of a unique detachable toy element, and wherein said ERC comprises at least:
    a. a nonconductive housing configured to match the TAG housing so as to allow mechanical connection between them;

b. two conductive elements configured to contact with the two PCB pads of the tag; and c. a magnet or a magnetizable material configured for stable attachment of the ERC to the TAG;

wherein identification of said detachable toy element and its position on said play structure are obtained upon attachment of said TAG component and said ERC.

2. A recognition arrangement according to claim 1, wherein attachment of said TAG component and said ERC affixed to said play structure is detected by periodic scanning of a control unit connected to said play structure for changes of voltage or current values, and wherein upon detection of such a change, the sampled value is delivered to said smart device for further interpretation and display.

3. A recognition arrangement according to claim 1, wherein the resistor is a 1-wire memory and wherein a third conductive element is connected to the ground.

4. A recognition arrangement according to claim 1, wherein said two conductive elements are metal pins.

5. A recognition arrangement according to claim 1, wherein said ERC further comprises at least two holes configured to allow pass way of electric wires from the ERC to a control unit so as to deliver a signal created upon attachment of a TAG to said ERC.

6. A recognition arrangement according to claim 1, wherein each ERC positioned on said toy structure is connected to said control unit via one communication line of said control unit.

7. A recognition arrangement according to claim 1, wherein two or more ERCs positioned on said toy structure are connected to said control unit via one communication line of said control unit.

8. A recognition arrangement according to claim 1, wherein said detachable toy element comprises a TAG and at least one ERC and it is configured to be cascaded with at least one additional detachable toy element.

9. A recognition arrangement according to claim 1, wherein said TAG comprises an active component.

10. A recognition arrangement configured to allow identification of a detachable toy element and its relative position on a play structure so as to enable a further display of a virtual character of said toy element in its relative position on the play structure on a smart device screen displaying an illustration of said play structure, said arrangement comprising a TAG component affixed to said toy element, an environmental recognition component (ERC) affixed to said play structure, and a control unit, wherein identification of said detachable toy element and its position on said play structure are obtained upon attachment of said TAG component and said ERC by periodic scanning of said control unit for changes of voltage or current values, and wherein upon detection of such a change, the sampled value is delivered to said smart device for further interpretation and display, wherein said TAG comprises a non-conductive housing, two PCB pad rings separated from one another by an insulating ring, a resistor and a metal ERC comprises a nonconductive housing, two conductive elements configured to attach said PCB pad rings of the TAG, and a magnet, and wherein, upon attachment of the TAG and the ERC an electric circuit is closed and a resistance value correlative to the resistor of said TAG is delivered to said control unit.

11. A recognition arrangement according to claim 10, wherein the communication between the TAG, the ERC and the control unit is either an analog communication or a digital communication.

12. A recognition arrangement according to claim 10, wherein the resistor is a 1-wire memory.

* * * * *